Jan. 15, 1952     C. F. TERWILLEGER     2,582,570
PRESSURE FLUID SERVOMOTOR AND VALVE SYSTEM THEREFOR
Filed Feb. 14, 1949     2 SHEETS—SHEET 1

Inventor
C. F. TERWILLEGER
By Cook & Robinson
Attorney

Jan. 15, 1952     C. F. TERWILLEGER     2,582,570
PRESSURE FLUID SERVOMOTOR AND VALVE SYSTEM THEREFOR
Filed Feb. 14, 1949     2 SHEETS—SHEET 2
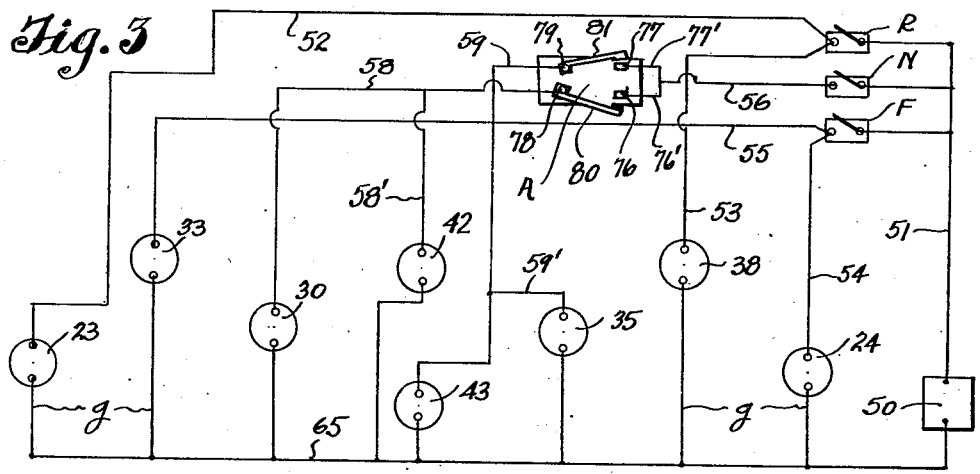
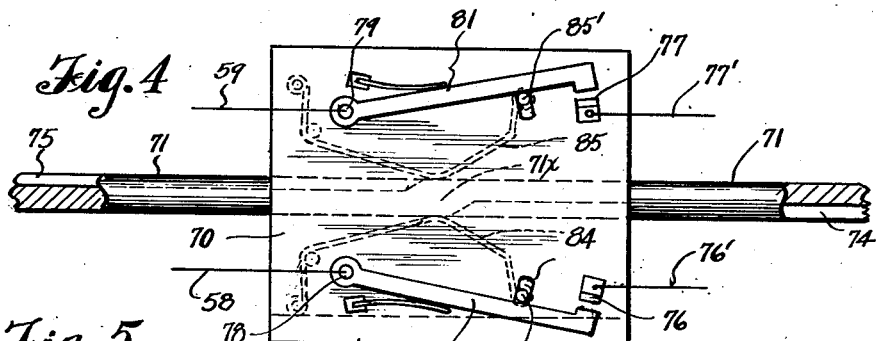
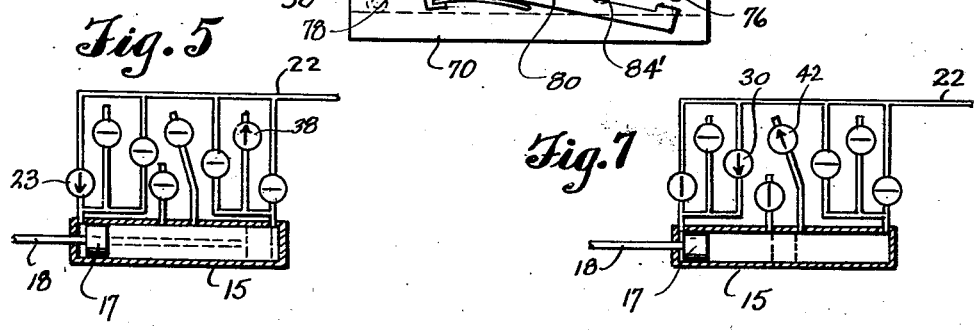
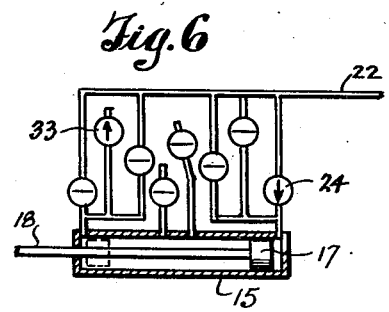
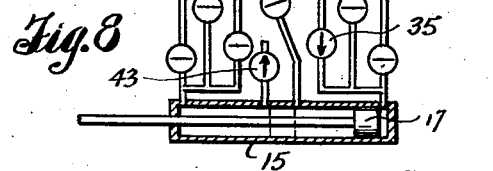
Inventor
C. F. TERWILLEGER
By Cook & Robinson
Attorney Patented Jan. 15, 1952

2,582,570

UNITED STATES PATENT OFFICE 2,582,570

PRESSURE FLUID SERVOMOTOR AND VALVE SYSTEM THEREFOR

Clarence F. Terwilleger, Seattle, Wash.

Application February 14, 1949, Serial No. 76,331

3 Claims. (Cl. 121—38)

This invention relates to control mechanisms, and it has reference more particularly to a mechanical, air powered means of a type especially applicable for the control of an engine or other reversible power device having a shiftable control lever, or the like, whereby the power transmission mechanism of the engine or other device may be set either for forward or reverse driving, or in a neutral position.

More specifically stated, the present invention has reference to the provision of an engine control device comprising an air cylinder to which operating air may be admitted under control of electrically operated valves to set the power transmission means for forward or reverse driving or for neutral operation; the valves being controlled by switches which may, if desired, be located at points remote fom the engine.

It is also an object of the invention to provide a mechanism of the above stated kind that is relatively simple in design, relatively inexpensive to construct, easy to control and positive and quick in its action.

Yet another object of the invention resides in the novel use and arrangement, and in the functional association of a plurality of solenoid valves with an air jack or cylinder for controlling the admittance and exhaustion of air from the cylinder as a means for operating the jack piston which has its rod attached operatively with the engine control member.

Still further objects of the invention reside in the details of construction of parts and in their combination and mode of operation as will hereinafter be fully described.

In accomplishing the above mentioned and other objects of the invention, I have provided the improved details of construction, the preferred forms of which are illustrated in the accompanying drawings, wherein:

Fig. 3 is a wiring diagram for the electrical control system of the device of Fig. 1.

Fig. 4 is a top view of the automatic switch mechanism used with the device, showing details of its construction.

Figs. 5, 6, 7 and 8 are views which, respectively, diagrammatically show the setting of various valves for shifting the piston from forward to reverse; from reverse to forward; from forward to neutral; and from reverse to neutral.

Figure 1:
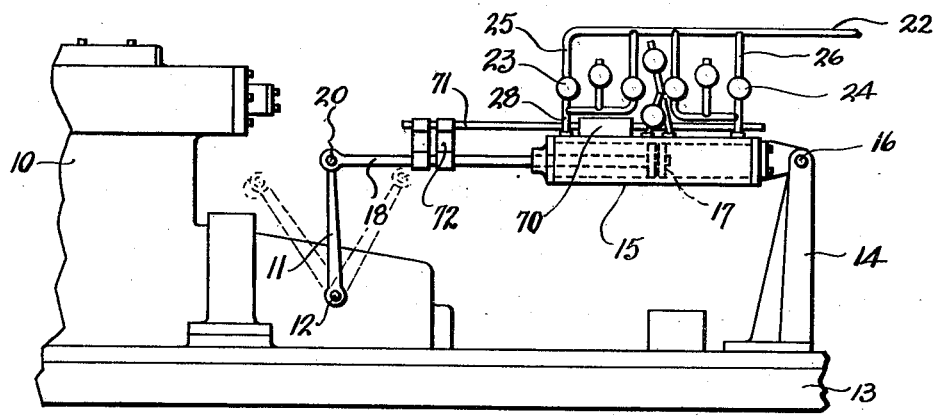
Fig. 1 is a side view of a portion of an engine of typical kind, equipped with a control device embodied by the present invention.

Referring more in detail to the drawings, and more particularly to Fig. 1: 10 designates a portion of an engine which is typical of that type for which the present device is adapted for use. Associated with the engine's power transmission gearing, not shown, is a lever 11 that is fixedly mounted at its lower end by a shaft 12 for swinging movement from the upright position in which it is shown, to a forward position or to a rearward position as indicated by the dotted line positions in Fig. 1.

The engine 10 is mounted on a base frame 13. Erected on this frame, at a distance spaced from the engine, is a bracket 14 to which one end of an air jack or air cylinder 15 is pivotally attached by a pivot pin or bolt 16. Reciprocally contained in the cylinder 15, is a piston 17, and from this a piston rod 18 extends to and is pivotally connected at its end to the upper end of the lever 11 by a pivot bolt 20.

The assembly of parts, as so far described, provides that by shifting the piston in its cylinder, the position of the lever 11 may be changed accordingly. Thus when the piston is at an intermediate position in the cylinder, for example, the dotted line position of Fig. 1, the power transmission mechanism of the engine will be set for neutral operation. When it is moved to the forward limit, then the lever 11 will be positioned for forward driving and, likewise, when it is moved to the rearward end of the cylinder, then the power transmission means will be set for reverse driving.

The movements of the piston are effected by a controlled application of fluid pressure medium to and from the cylinder. Preferably, I use air under suitable pressure as the operating medium, and the application and exhaustion of air to and from the cylinder for controlling the various movements of the piston is under control of a plurality of normally closed solenoid valves, the use and arrangement of which will now be described.

Figure 2:
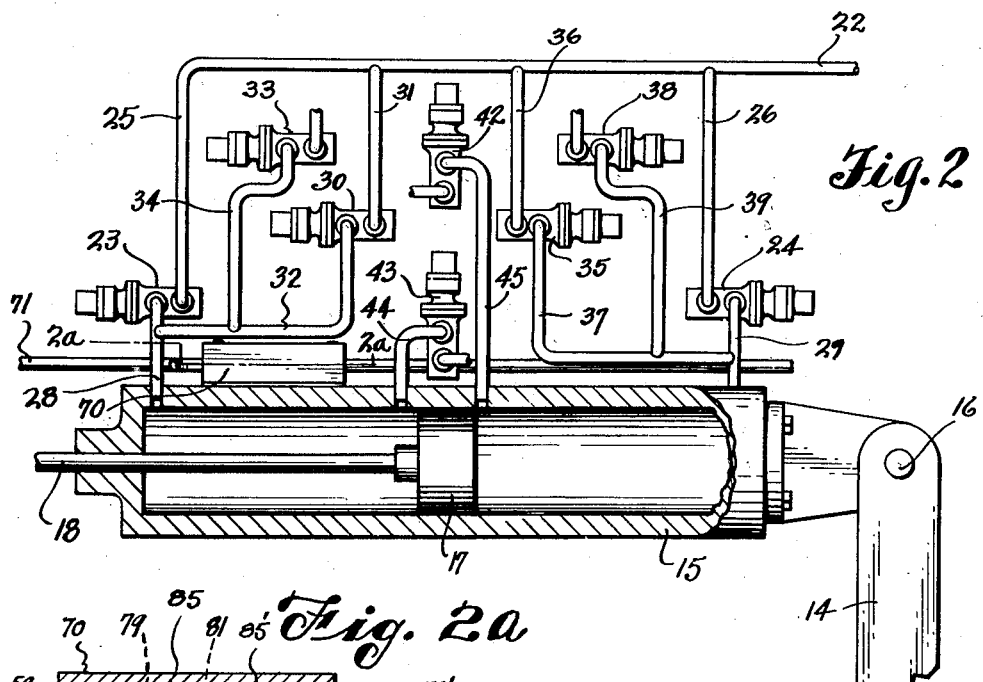
Fig. 2 is a longitudinal, sectional view of the control cylinder, showing the piston, the piston rod and the manner of connecting the various solenoid controlled air valves therewith and with the source of operating air.

Referring more in detail to Fig. 2, 22 designates a pipe line leading directly from a source of compressed air or whatever pressure medium is to be used. For the present purpose it will be referred to as air. The admittance of air into the forward end of the air cylinder is controlled by solenoid valves which are designated in their entireties by reference numerals 23 and 30. Valve 23 has a direct connection at one side by means of pipe 25 with the air pipe 22, and has a pipe connection 28 leading from its other side to the forward end of the air cylinder. Likewise, valve 30 has a pipe connection 31 with pressure line 22 and a pipe connection 32 leading into pipe 28.

For the admittance of air pressure to the rearward end of the cylinder, I provide solenoid valves 24 and 35. Valve 24 has a pipe connection 26 at one side with the pressure line 22, and a pipe connection 29 from its other side into the cylinder. The valve 35, likewise, has pipe connection 36 to the pressure line 22 and a connection 37 from its other side into pipe 29.

Associated with valves 23 and 30 is a solenoid operated exhaust valve 33 and this has an atmospheric opening at one side and has a direct connection 34 at its other side, with pipe 32. When either valve 23 or 30 is opened, operating air will be admitted therethrough from pipe 22 into the forward end of the cylinder 15 as a means for moving the piston rearwardly therein. When valve 33 is opened, air may be exhausted from the forward end of the cylinder through pipes 28, 32 and 34 and the valve 33.

A solenoid exhaust valve 38 also is associated with the valves 24 and 35. This has an opening to atmosphere at one side and is connected at its other side by a pipe 39 with pipe 37 which opens into pipe 29. When valve 38 is open, air may be exhausted from the rearward end of the cylinder.

Associated with the central portion of the cylinder 15 are solenoid exhaust valves 42 and 43. Valve 43 has an opening at one side to atmosphere and has pipe connection 44 at its other side leading into the cylinder 15 at a point that is closely adjacent the forward side of the piston 17 when it is in a neutral position in the cylinder. Likewise, valve 42 has an opening to atmosphere at one side and at its other side has a pipe connection 45 opening into the cylinder at a position that will be closely adjacent the rearward side of the piston when it is in a neutral setting. The preferred arrangement of valves is as shown in Fig. 2, but they may be in other arrangement so long as their pipe connections with the cylinder correspond to that shown and their functions are not changed.

The valves may be alike in construction and their mode of operation the same. The function of each valve is to control the flow of air therethrough into or from the cylinder. Each valve comprises a casing containing a movable valve element that is retained normally in a closed position by spring means or otherwise, and movable upon the energization of its associated solenoid, to an open position. Normally, all valves are closed and selected valves are opened only when change in the operating position of the engine is to be made.

The wiring diagram for the control of the solenoids is shown in Fig. 3, wherein 50 designates a source of electrical energy with line 51 leading therefrom, and provided with connections with each of three normally open switches designated at F, R and N, which, respectively, are closed to effect the forward, reverse or neutral setting of the engine by the mechanism. From the outgoing side of switch R circuit wires 52 and 53 lead, respectively, to the solenoids of valves 23 and 38. From the outgoing side of switch F, circuit wires 54 and 55 lead, respectively, to the solenoids of valves 24 and 33. From the outgoing side of switch N, a circuit wire 56 leads to a control switch, presently described in detail but designated in Fig. 3 in its entirety by reference character A. From this latter switch, a circuit wire 58 leads to valve 30 and there is a connection 58' from wire 58 to solenoid valve 42.

Another circuit wire 59 leads from switch A to valve 43, and there is a connection 59' from wire 59 to solenoid valve 35.

Each of the solenoids of the eight solenoid valves used has a ground connection, such as at g in Fig. 3, with a ground wire 65.

Figure 2A:
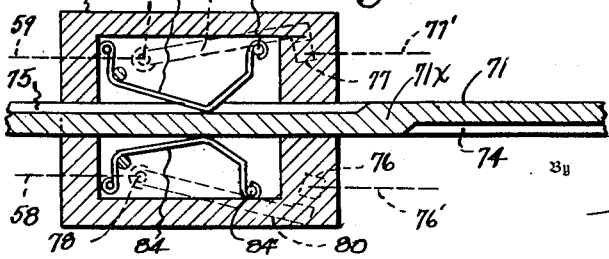
Fig. 2a is a horizontal section of the circuit control switch used as a part of the system, taken on line 2a—2a in Fig. 2.

The switch designated by reference character A comprises an insulated base block 70 mounted on top of or fixed relative to cylinder 15. Slidable through the block is a rod 71 which is parallel with the axis of the cylinder 15 and at one end is fixed by means of a bracket 72 to the piston rod 18 in such manner that rod 71 moves endwise in the block in accordance with travel of the piston in its cylinder. The rod 71 is longitudinally channeled in opposite sides, the channels extending in opposite directions from a short unchanneled portion designated by numeral 71a in Fig. 2a. The channels are designated, respectively, by numerals 74 and 75. When the power transmission devices of the engine are set in a neutral position, the piston 17 will be located in the neutral position in cylinder 15, and the unchanneled part 71x of the rod 71 will assume the position in block 70 as shown in Fig. 4.

Fixed on the block 70 at one end and at opposite sides of position of the rod 71, are contacts 76 and 77 to which wires 76' and 77', leading from wire 56, are connected.

Also mounted on the block for slight swinging movement on pivot studs 78 and 79, respectively, are switch arms 80 and 81, designed to make and break circuit connection at their swinging ends with the contacts 76 and 77, respectively. The circuit wires 58 and 59 previously mentioned lead respectively from the studs 78 and 79. Thus whenever arm 80 or arm 81 engages with the corresponding contacts 76 and 77, a circuit will be closed through the switch arm, pivot stud and wire 58 or 59 to energize the solenoid valves connected therewith.

The switch arms 80 and 81 are spring pressed toward their circuit closing positions and are caused to move to open or closed positions in accordance with the longitudinal movements of rod 71, this being accomplished through the following means:

Mounted in the block 70 at opposite sides of the rod 71 are spring arms 84 and 85, each of which is fixedly mounted at one end to extend along the rod and at a point between its ends to press thereagainst. From their points of contact with the rod 71, the spring arms are turned outwardly, and at their ends carry upwardly extending pins 84'—85 that pass through slots in the top wall of the hollow block 70 to engage, respectively, with the switch arms 80 and 81 for their actuation.

Switches R, N and F may be of the push-button type, or of any other type that is normally open and must be pushed to closed position and open when pressure is removed.

Assuming the parts to be so constructed and assembled, and that the drive is set for forward operation and that all waves are closed, when the piston 17 is at the forward end of the cylinder 15, as in Fig. 5, the rod 71 will then be disposed at that position at which the switch arm 80 is permitted to engage contact 76 and switch arm 81 is caused to be disengaged from contact 71.

Now should it be desired to shift the drive from "forward" to "reverse" operation, the operator momentarily closes switch R. An electric circuit is thereby closed through the actuating solenoids of valves 23 and 38, the valves are thereby opened and pressure medium from pipe 22 is admitted to the cylinder to shift the piston 17 rearwardly and pull lever 11 to reverse position. Likewise, to shift from "reverse" to "forward" operation, the switch F is momentarily held closed. This results in the opening of valves 24 and 33 and the admittance of pressure medium to the rearward end of the cylinder to effect the shifting of the piston 17 to the forward end of the cylinder 15.

When the rod 71 is in its neutral position, the arms 84 and 85 engage with the unchanneled portion 71x thereof in such manner as to cause them to hold their corresponding switch arms 80 and 81 disengaged from the contacts 76 and 77. When rod 71 is moved in one direction from neutral, the spring 84 under tension drops into the channel 74 and thus is moved away from the switch arm 80 and the latter makes a circuit connection with contact 76. Likewise, if the rod 71 moves in the other direction, the arm 85 drops into channel 75 and permits arm 81 to engage contact 77 to close a circuit connection.

When it is desired to shift from "forward" setting to "neutral," switch N is momentarily closed. When the parts are in "forward" setting, the arm 80 and contact 76 are engaged; thus when switch N is closed, a circuit is completed through valves 39 and 42. Thus pressure medium is admitted through valve 30 to drive the piston 17 back to neutral position, as pressure medium at the other side of the piston is exhausted through valve 42. As the piston 17 reaches neutral, the rod 71 moves to its neutral position, as in Fig. 4, and thus the switch arm 80 is disengaged from contact 76. This opening of the circuit permits both valves 30 and 42 to close, and the piston checked and held at neutral setting.

Likewise, if the drive is in "reverse" setting and it is desired to set it at "neutral," the switch N is pressed closed. At this time the switch arm 81 will be engaged with contact 77, thus closing switch N. This causes circuits to be closed through valves 35 and 43 and the pressure medium from pipe 22 admitted through valve 35 to drive the piston 17 to neutral setting. As it reaches this position, rod 71 causes the arm 81 to be disengaged from contact 77 and the circuit therethrough to be opened, to close the valves 35 and 43 thus to hold the "neutral" setting.

If it is desired to shift from "neutral" to "forward," or from "neutral" to "reverse," the switches F and R are used in the same manner as for shifting from reverse to forward, or from forward to reverse, and the same valves are energized as for these operations. The switch A is used only in connection with the changing of the drive from forward or reverse to neutral.

This device provides a practical, effective and easily controlled mechanical means for accomplishing what is rather difficult to do by hand, and makes possible the control of the engine from a remote location.

Having thus described my invention, what I claim as new therein and desire to secure by Letters Patent is:

1. A servo-motor for shifting the control lever of the power transmission mechanism of an engine to position at opposite sides of a neutral setting for forward or reverse driving; said servo-motor comprising a pressure cylinder, a piston reciprocally movable therein and a rod connecting said piston with the said lever for its actuation, a source of fluid pressure medium, a first and a second connection from said source of pressure medium into each of the opposite ends of the cylinder, a normally closed valve in each connection, a normally closed pressure exhaust valve for each of the opposite ends of the cylinder, pressure exhaust valves opening from the cylinder adjacent opposite sides of the neutral position of the piston therein, individual solenoids for the valves adapted when energized to move their respective valves to open position, electric circuits for the various solenoids, control switches connected with said circuits and selectively operable each to close circuits for opening a valve in one of said first connections to admit pressure medium to the corresponding end of the cylinder and to open the exhaust valve serving the other end of the cylinder, and other switches selectively operable, each to close the circuit for opening a valve in one of said second connections and to simultaneously open the opposite neutral position exhaust valve.

2. A combination as recited in claim 1 including also a switch connected with said circuits and operable under control of movement of said piston from either end of the cylinder to a neutral position to open the then energized circuits.

3. A servo-motor for shifting the control lever of the power transmission mechanism of an engine to positions at opposite sides of a neutral setting for forward or reverse driving, said motor comprising a pressure cylinder, a piston movable therein, a piston rod extended from the cylinder connection with the control lever for its actuation between opposite limits of travel by movement of the piston between opposite limits of travel, a source of fluid pressure medium, a first and a second connection from said source of pressure medium into each of the opposite ends of the cylinder, a normally closed valve in each connection, a normally closed pressure exhaust valve for each of the opposite ends of the cylinder, pressure exhaust valves opening from the cylinder adjacent opposite sides of the neutral position of the piston therein, individual solenoids for the valves adapted when energized to move their respective valves to open position, electric circuits for the various solenoids, a "reverse switch" operable to close circuits to solenoids that admit medium to the forward end of the cylinder and exhaust medium from the rearward end, a "forward switch" operable to energize solenoids to admit pressure medium to the rear end of the cylinder and exhaust it from the forward end, a neutral switch operable to energize circuits whereby the medium is admitted through a second connection to move the piston to a neutral position from forward or reverse position, and an automatic switch operable under control of the piston movement to open the energized circuit when the piston reaches a neutral position.

CLARENCE F. TERWILLEGER.

REFERENCES CITED

The following references are of record in the file of this patent:

UNITED STATES PATENTS

| Number | Name | Date |
|---|---|---|
| 1,841,629 | Pigeolet | Jan. 19, 1932 |
| 2,156,118 | Kliesrath | Apr. 25, 1939 |
| 2,221,365 | Ware | Nov. 12, 1940 |
| 2,234,019 | Bragg | Mar. 4, 1941 |
| 2,314,444 | Crittenden | Mar. 23, 1943 |
| 2,375,946 | Reichelt | May 15, 1945 |